3,100,696
METHOD AND APPARATUS FOR SEPARATING GASES
Rudolf Becker, Munich-Solln, Germany, assignor to Gesellschaft für Linde's Eismaschinen Aktiengesellschaft, Munich, Germany, a company of Germany
Filed June 8, 1959, Ser. No. 818,806
Claims priority, application Germany June 11, 1958
21 Claims. (Cl. 62—13)

The present invention relates to an improved method of and apparatus for carrying out heat exchange effects in a plant for separation of gases, preferably a plant for separation of air into its constituents such as nitrogen and oxygen, working by means of regenerators connected ahead of a separator column, where at least one additional regenerator is used, preferably interposed in the reversing circuit of the regenerator arrangement. The object is to heat gases or gaseous mixtures which are to be expanded in an expansion machine, particularly an expansion turbine, before these gases are expanded in order to provide favorable sublimation conditions in the regenerators and to avoid liquefaction of the crude gas as far as possible in the turbine itself. Such an arrangement is known and the present invention is directed to a further improvement therein and which has for its object to utilize an additional heat exchanger, serving as a source of heat, and for other purposes too, to heat the gas to be expanded in the turbine or other gases.

The invention thus is concerned with an improved process and apparatus for carrying out heat exchange processes in a gas separation plant working with regenerators operatively associated with and preceding a separator column, preferably an air separation plant, using at least one additional regenerator, preferably interposed in the reversing circuit of the regenerator arrangement and traversed by a part of the crude gas branched off after preliminary treatment in the separator column. According to the invention the gas issuing from the additional regenerator and heated by it is brought into a heat exchanger such as, for example, a tubular heat exchanger, in heat exchange relation with at least a part of the crude gas, particularly air and/or at least one separation product thereof, for example nitrogen.

According to the invention the arrangement is made even more versatile in that at least one separation product, for example nitrogen, is taken from a separating apparatus either in one single current or two partial currents, to be heated to ambient temperature at least partly in at least one heat-exchanger by the gas issuing from the aforesaid additional regenerator.

Preferably only a partial current of the gas heated in the additional regenerator or regenerators, preferably after extensive heating, is brought into heat exchange relation with one part, preferably a purer part of the separation product, while the other or additional partial current of such gas, particularly the residual gas current is preferably used for heating gases fed to an expansion turbine.

According to another feature of the invention, the two partial gas currents of the separation product are tapped from different points on the separator column as a high purity and less pure product, respectively, the purer fraction being heated by heat exchange in at least one heat exchanger.

In order that the special heating cycle, consisting primarily of a part of the crude gas, and produced by the additional regenerator, can work work at any desired pressure level, it may be advisable to arrange a blower for the heat exchanger in this circuit, particularly in the feed and/or discharge current.

According to another feature of the invention, it is also possible in certain circumstances to get along without a separate blower, if the entire amount of the gas conducted through the additional regenerator arrangement is expanded by the expansion turbine or any other device.

The invention will become further understood from the following detailed description of a few embodiments thereof and the accompanying drawings. In these drawings.

Figure 1:
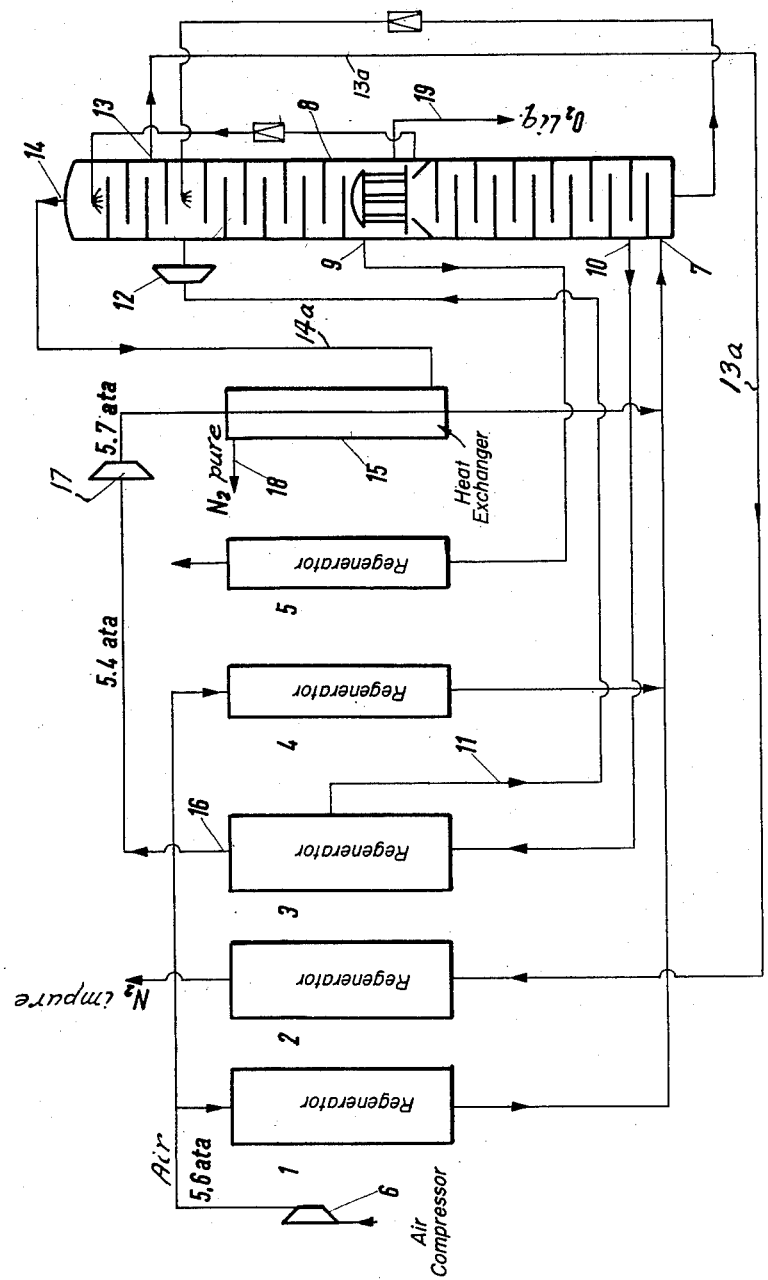
FIG. 1 is a diagrammatic view of a plant for separation of air and including an additional regenerator, and a single heat exchanger through which the gas from such regenerator passes in heat exchange relation with a separation product of the gas the pressure being indicated in atmospheres absolute (ata.)

With reference now to the drawings and in particular to FIG. 1, the regenerators employed in the gas separation plant are designated by numerals 1 through 5. In the switch phase represented in FIG. 1 by the arrows, air compressed in compressor 6 flows through regenerator 1, is cooled therein and then flows to inlet 7 which leads to the sump at the bottom of the double separator column 8. Another part of the compressed air flows in addition through regenerator 4 into the sump at the bottom of column 8. Oxygen taken from the separator column 8 at tap point 9 is heated again in regenerator 5 and flows off to a point of consumption. The additional regenerator 3, provided in accordance with the principles of a known patent, i.e., German Patent 1,046,640, for heating a partial current of air taken off from the sump of column 8 at tap 10, delivers a portion of the air heated by it to an expansion turbine 12 via line 11, this air being expanded in the turbine 12 as the latter produces a work output and then being delivered from turbine 12 into the upper portion of column 8.

According to the FIG. 1 embodiment of the present invention, nitrogen is tapped from the upper portion of column 8 at two points. One of these, tap point 13, is located below the head of the column and the nitrogen, flowing off through line 13a, which is not completely pure, enters regenerator 2 and is cooled. Nitrogen flowing off from tap point 14 located at the head of column 8 is relatively purer and is carried through line 14a into heat exchanger 15 in heat exchange relation with the other portion of the air current heated in regenerator 3 and which is delivered at outlet 16, this air current flowing through a blower 17 before being delivered to heat exchanger 15, and after flowing through the latter joins with the air which enters the sump at the bottom of column 8.

Pure nitrogen which has been delivered to heat exchanger 15 via line 14a makes its exit from the plant at outlet 18 and is not subject to contamination by any deposits from the regenerators since it is heated in the heat exchanger 15 without coming into contact with the crude gas or its deposits. At tap point 19 on column 8, liquid oxygen designated in FIG. 1 by symbol "$O_2$ Liq." can be taken off in known manner.

Figure 2:
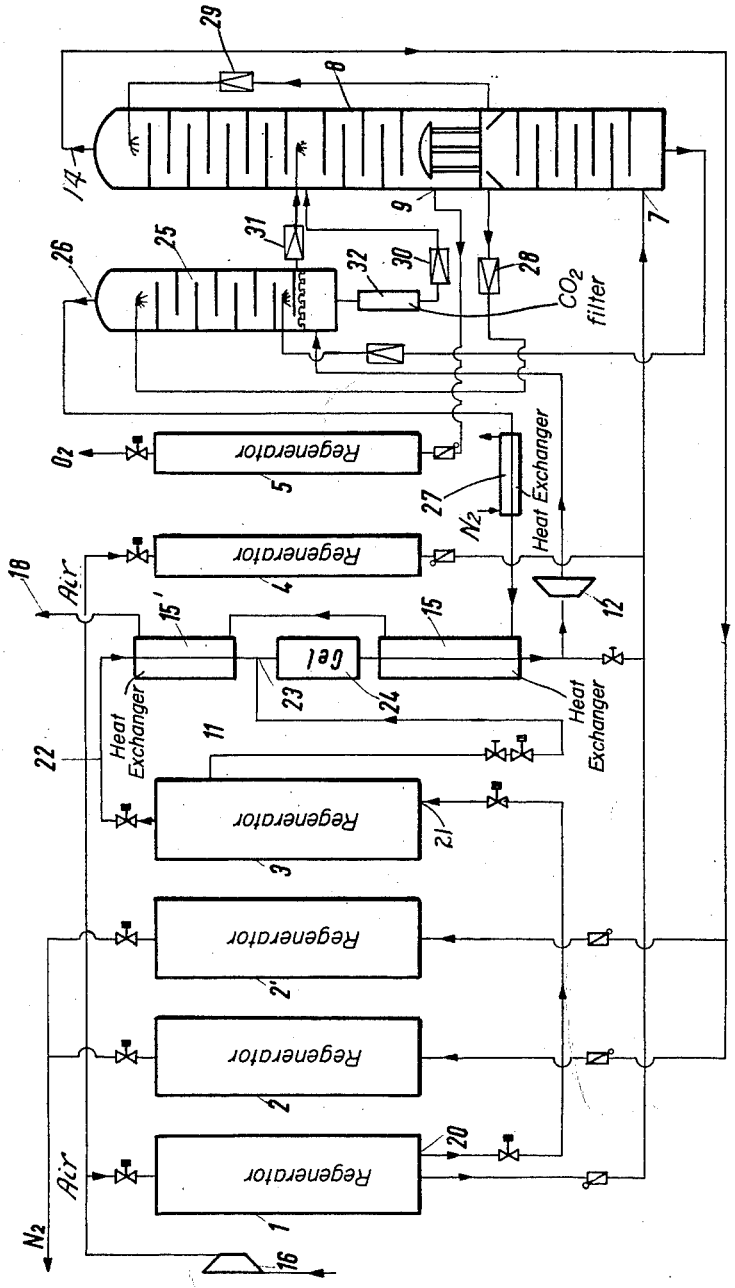
FIG. 2 is a view similar to FIG. 1 but showing a modified arrangement wherein two separating columns are used and wherein the gas current from the additional regenerator is passed through two heat exchangers in series.

In the modification according to FIG. 2, those components which are identical with those shown in FIG. 1 have been given the same reference numerals. The regenerator arrangement is substantially the same as that shown in FIG. 1 except that a second regenerator 2' is connected in parallel with regenerator 2 to be cooled by the separation product nitrogen, in order to adapt the plant to the desired outputs of pure and less pure nitrogen. The air current necessary for heat regenerator 3 is branched off directly from regenerator 1 at tap 20 and introduced into regenerator 3 at inlet 21. In this embodiment, two heat exchangers 15, 15' are arranged in series with a gel absorber unit 24 arranged in the path of the fluid flow between the two exchangers. One partial air current issuing from regenerator 3 over line 22 passes through both heat exchangers 15 and 15' and gel absorber unit 24 and is then delivered at least partly by way of an expansion turbine 12 into the sump of an auxiliary column 25 and the remainder into the sump of column 8. The other partial air current issuing from regenerator 3 over line 11 is tapped in at point 23 between the two heat exchangers and flows only through the gel absorber unit 24 and heat exchanger 15'.

Another difference between the arrangement shown in FIG. 1 and that of FIG. 2 is that two outlets for nitrogen are provided in different columns. One outlet for nitrogen is at outlet 14 at the top of column 8 in the same manner as for the FIG. 1 embodiment. The other outlet for nitrogen is located at outlet 26 at the top of an auxiliary column 25 arranged between the pressure column and the upper column of double column 8. The nitrogen issuing from auxiliary column 25 is heated by passing the same through the heat exchangers 15 and 15' in series, and issues from outlet 18. If desired or necessary, the nitrogen from column 25 can be passed through an additional heat exchanger 27 before entering the lowermost heat exchanger 15', heat being supplied to the heat exchanger 27 for transfer to the nitrogen from a separate heat circuit.

The pressure of the auxiliary column 25 is so correlated to the pressure in the two columns of the double column 8 that there will be a greater pressure drop available for the pure nitrogen from column 25 for traversing the heat exchangers 15 and 15'.

Another object of the auxiliary column 25 is to retain in its bottom part, by scrubbing, the carbon dioxide which is separated in an exchangeable filter unit 32. This separation can also be effected, if necessary, in a separate scrubber vessel. Reference numerals 28 and 29 designate expansion valves through which nitrogen is expanded from the pressure column of column 8 into the auxiliary column 25 and into the upper column of double column 8, respectively. The liquid air and gaseous oxygen mixture are fed over valves 30, 31, respectively, from the auxiliary column 25 to the upper column of double column 8.

Figure 2A:
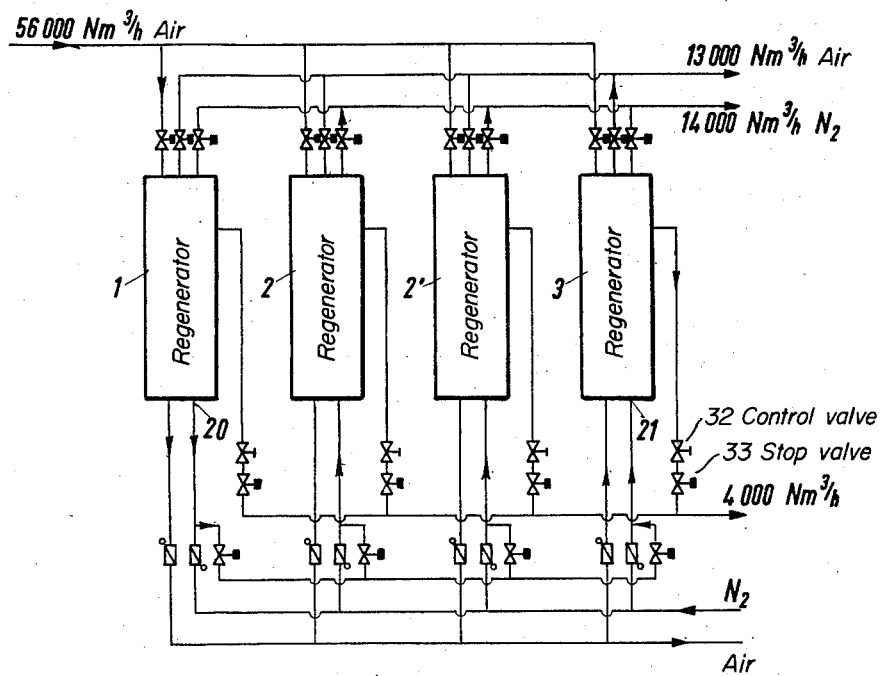
FIG. 2a is a view showing the four regenerators belonging to the FIG. 2 embodiment together with the pilot valves corresponding to the specification.

In FIG. 2a there are shown the regenerators previously shown in FIG. 2 and with all of the necessary valving means included for reversing the direction of flow. There are included, in FIG. 2a, especially the to- and from-conduits through which the gas mixtures are to be conducted. Over and above this, FIG. 2a corresponds to what has been shown in FIG. 2.

With regard to the branch lines descending from the intermediate portions of each of columns 1, 2, 2' and 3 the upper one, 32, of the two valves shown in a control valve and the lower one 33 is a stop valve.

It is also within the scope of the present invention to effect additional combinations between embodiments of the above described type and other possibilities, as well as to heat other products by the heating circuit in heat exchangers. It is to be noted that the bottom part of the auxiliary column 25 is designed as a scrubber vessel which is preferably associated with a filter for separating the impurities, and in particular carbon dioxide.

I claim:

1. Apparatus for separating air into its constituents, comprising a separating column producing oxygen and nitrogen from the air; means including a compressor and first regenerator for introducing air into the bottom of said separating column; a second regenerator, a first heat-exchanger; means for feeding air through said second regenerator and thence through said first heat-exchanger; means for feeding nitrogen from said separating column into said first heat-exchanger for heat exchange with the heated air produced by said second regenerator; a second heat-exchanger connected in series with said first heat-exchanger, the nitrogen being fed through said first and said second heat-exchangers in series; said apparatus being further characterized in that air heated by said second regenerator is supplied in two partial currents to said heat exchangers, one such partial air current being heated extensively by passing the same entirely through said second regenerator and such heated air current being passed in series through both of said heat exchangers, and the other partial air current being heated less extensively by passing the same only partly through said second regenerator, such other heated partial air current being passed through only one of said heat exchangers.

2. Apparatus for separating air into its constituents, comprising a separating column producing oxygen and nitrogen from the air; means including a compressor and first regenerator for introducing air into the bottom of said separating column; a second regenerator, a first heat-exchanger; means for feeding air through said second regenerator and thence through said first heat-exchanger; means for feeding nitrogen from said separating column into said first heat-exchanger for heat exchange with the heated air produced by said second regenerator; a second heat-exchanger connected in series with said first heat-exchanger, the nitrogen being fed through said first and said second heat-exchangers in series; said apparatus being further characterized in that said apparatus includes a gel absorber unit in the air line between said first and second heat exchangers.

3. In a process for the separation of a gas mixture into a higher boiling point fraction and at least one fraction of lower boiling point, the method which comprises compressing the gas mixture, cooling and purifying the compressed gas mixture in at least one regenerator of a reversing regenerator system, feeding a first part of the cooled compressed gas mixture into a rectifying device, passing a second part of the cooled compressed gas mixture in the opposite direction through a second regenerator, warming this second part thereby at least partially to ambient temperature, cooling said warmed second part of the gas mixture by heat exchange with at least part of a separation product withdrawn from the rectifying device, warming said separation product thereby to ambient temperature, passing said second part of the gas mixture into the rectifying device, withdrawing other separation products from the rectifying device and warming them in further reversing regenerators.

4. Method as claimed in claim 3, in which said second part of the gas mixture is divided within the second regenerator into two partial streams, one of higher, one of lower temperature, bringing said part of higher temperature into heat exchange with said part of separation product, mixing the two partial streams and bringing the resulting stream into further heat exchange with said part of a separation product.

5. Method as claimed in claim 3, in which at least part of said second part of the gas mixture is expanded after heat exchange with said part of a separation product by production of external work and then passed into a low pressure part of the rectifying device.

6. Method as claimed in claim 3, in which said second part of the gas mixture is cleaned from impurities, such as carbon dioxide carried along from the regenerator arrangement by liquefied gas by means of scrubbing before said gas enters the rectifying device.

7. Method as claimed in claim 3, in which said gas mixture is air, and in which the air is separated into oxygen and nitrogen.

8. Method as claimed in claim 3, which comprises said second part of the gas mixture being passed through said second regenerator is partly tapped off after having traversed only a part of said regenerator and is allowed to expand and simultaneously perform work, prior to being fed into a low pressure part of said rectifying device, whereas the remainder of said gas mixture after having totally traversed said second regenerator is fed by a blower into said heat-exchanger for being cooled by at least part of a separation product thereby warmed, said cooled gas mixture being united with said first part of the cooled compressed gas mixture prior to being fed into said rectifying device.

9. Method as claimed in claim 8, in which said separation product is tapped off from said rectifying device consisting of a high pressure and a low pressure column partly as a high purity product from the top of said low pressure column and partly as a less pure product from a point below the top of said low pressure column, whereby the high purity product is warmed by direct heat-exchange with said warmed second part of the gas mixture and the less pure product is warmed by indirect heat-exchange with the compressed gas mixture within said regenerator system.

10. Method as claim in claim 6, in which said separation product is tapped off from said rectifying device consisting of a high pressure, a low pressure—and an auxiliary column partly as a less pure product from the top of said low pressure column and partly as a high purity product from the top of said auxiliary column the lower part of which works as said scrubbing means, the high purity product being warmed by direct heat exchange with said warmed second part of the gas mixture and the less pure product being warmed by indirect heat exchange with the compressed gas mixture within said regenerator system.

11. A gas fractionating installation comprising a regenerator arrangement for freeing a gas mixture of its easily condensible components by heat-exchange with at least part of at least one of the cold separation products of said gas mixture, at least one additional regenerator means for reheating at least part of said gas mixture formerly cooled in said regenerator arrangement by heat-exchange with said at least part of said at least one cold separation product and with an analogous part of said gas mixture itself previously cooled in said regenerator arrangement, a rectifying device for said gas mixture, at least one recuperative heat-exchanger, conduit means for causing said part of said previously cooled gas mixture to flow through said additional regenerator means so as to become heated by heat-exchange with at least part of the incoming gas mixture and for causing at least part of the gases which are reheated in said additional regenerator means to flow forward to said rectifying device by way of said recuperative heat-exchanger in which they are caused to exchange heat with at least part of at least one of the cold separation products of said gas mixture, the arrangement being such that at least part of at least one of the latter cold separation products becomes heated thereby to approximately ambient temperature, whilst said regenerator arrangement is provided for heating the remainder of said separation products tapped off from said rectifying device by heat exchange with at least part of the incoming gas mixture.

12. A gas fractionating installation according to claim 11, for separation of air into its constituents comprising said rectifying device consisting of a high pressure column and a low pressure column, an expansion turbine the inlet of which is connected to a side-outlet of said additional regenerator and the outlet of which is connected to said low pressure column.

13. A gas fractionating installation according to claim 11, comprising means for tapping at least two fractions of at least one of the cold separation products from said rectifying device and for conducting only the purest of said fractions to said recuperative heat-exchanger means, whilst means are provided for conducting the less pure fraction to said regenerator arrangement for heating them to approximately ambient temperature.

14. A gas fractionating installation according to claim 13, for separation of air into its constituents, wherein said rectifying device consists of a high pressure column, a low pressure column and an auxiliary column, which is arranged to operate at a pressure intermediate between those of the aforesaid two columns, the arrangement being such that liquid is transferred from the high pressure column to the auxiliary column and also from the latter to the low pressure column, and pure gases from said auxiliary column are heated in said recuperative heat-exchanger means, whilst gases leaving said additional regenerator means which are passed through said recuperative heat-exchanger means are fed forward to the auxiliary column, and the less pure gases from said low pressure column are conducted to said regenerator arrangement for heating to approximately ambient temperature by incoming air.

15. A gas fractionating installation according to claim 14, comprising an expansion turbine the inlet of which is connected to the outlet of said cooled gas mixture from said recuperative heat-exchanger means and the outlet of which is connected to said auxiliary column.

16. A gas fractionating installation according to claim 14, wherein the lower part of said auxiliary column is constructed as a scrubber for purifying the gases prior to their admission to the two-column separator, and wherein a filter for the separation of impurities is connected to said scrubber, the outlet of said filter being connected to said low pressure column by way of a throttle-valve.

17. Apparatus for separating air into its constituents, comprising a rectifying device consisting of a high pressure column and a low pressure column producing oxygen and nitrogen from the air; means including a compressor and first regenerator for introducing air into the bottom of said high pressure column; a second regenerator, a heat-exchanger, means for feeding part of said air coming from the lower part of said high pressure column through said second regenerator and thence through said heat-exchanger before being joined with said cooled air coming from said first regenerator; means for feeding pure nitrogen from the top of said low-pressure column through said heat-exchanger and a less pure fraction of nitrogen from said column tapped off below its top through a third regenerator for warming them as products to approximately ambient temperature; said apparatus being further characterized in that a medium part of said second regenerator is connected to said low-pressure column conducting air to the latter, and conduit means for conducting oxygen as a gaseous product from the lower part of said low pressure column through a further regenerator system, said oxygen being there warmed to approximately ambient temperature by air to be cooled.

18. Apparatus according to claim 17, further characterized by an expansion turbine the inlet of which is connected to said medium part of said second regenerator, and the outlet of which is connected to said upper low-pressure column of said rectifying device.

19. Apparatus for separating air into its constituents, comprising a rectifying device consisting of a high pressure column, a low pressure column and an auxiliary column partly interposed at a medium pressure between aforesaid two columns producing oxygen and nitrogen from the air, said auxiliary column being connected, at its lower part, by conduit and throttle valve means, to the bottom of said high pressure column, and at its lowest part connected to the middle part of said low pressure column at least partly by way of a filter, and at its upper part connected to the upper part of said high pressure column withdrawing liquid nitrogen from the latter; means including a compressor and first regenerator for introducing part of the cooled air into the bottom of said high pressure column; a second regenerator; a first and a second heat exchanger; means for feeding another part of the cooled air through said second regenerator and thence through said first and second heat-exchangers before introducing it into said rectifying device; means for feeding pure nitrogen from the top of said auxiliary column through said second and said first heat-exchangers in series and a less pure fraction of nitrogen from the top of said low pressure column through at least one further regenerator for warming them as products to approximately ambient temperature; said apparatus being further characterized in that air heated by said second regenerator is supplied in two partial currents to said heat-exchangers, one such partial air current being heated extensively by passing the same entirely through said second regenerator and such heated air current being passed in series through both of said heat-exchangers, and the other partial air current being heated less extensively by passing the same only partly through said second regenerator, such other heated partial air current being passed through only one of said heat-exchangers, whereby means are provided for conducting said joined currents of cooled air into said rectifying device at least partly by way of said auxiliary column.

20. Apparatus according to claim 19, further characterized by an expansion turbine the inlet of which is connected to said second heat-exchanger, and the outlet of which is connected to said auxiliary column, said expansion turbine thereby simultaneously performing work by expanding at least part of said cooled air into said auxiliary column, whilst means are provided for joining the remainder with said cooled air current from said first regenerator.

21. Apparatus as defined in claim 19, further comprising a gel adsorber unit interposed in the air line between said first and said second heat-exchangers and being fed by said two partial air currents from said second regenerator.

References Cited in the file of this patent

UNITED STATES PATENTS

| | | |
|---|---|---|
| 1,901,389 | Hazard-Flamand | Mar. 14, 1933 |
| 2,040,116 | Wilkinson | May 12, 1936 |
| 2,048,076 | Linde | July 21, 1936 |
| 2,209,748 | Schlitt | July 30, 1940 |
| 2,586,811 | Garbo | Feb. 26, 1952 |
| 2,659,216 | Sargent | Nov. 17, 1953 |
| 2,763,137 | Collins | Sept. 8, 1956 |
| 2,822,675 | Grenier | Feb. 11, 1958 |
| 2,861,432 | Haselden | Nov. 25, 1958 |
| 2,863,295 | Newton | Dec. 9, 1958 |
| 2,915,882 | Schuftan et al. | Dec. 8, 1959 |
| 2,918,802 | Grunberg | Dec. 29, 1959 |

FOREIGN PATENTS

| | | |
|---|---|---|
| 1,046,640 | Germany | Dec. 18, 1958 |
| 1,126,478 | France | July 30, 1956 |